Jan. 1, 1952  R. P. BALLOU  2,580,717
MECHANICAL MEASURING DEVICE
Filed Jan. 15, 1948
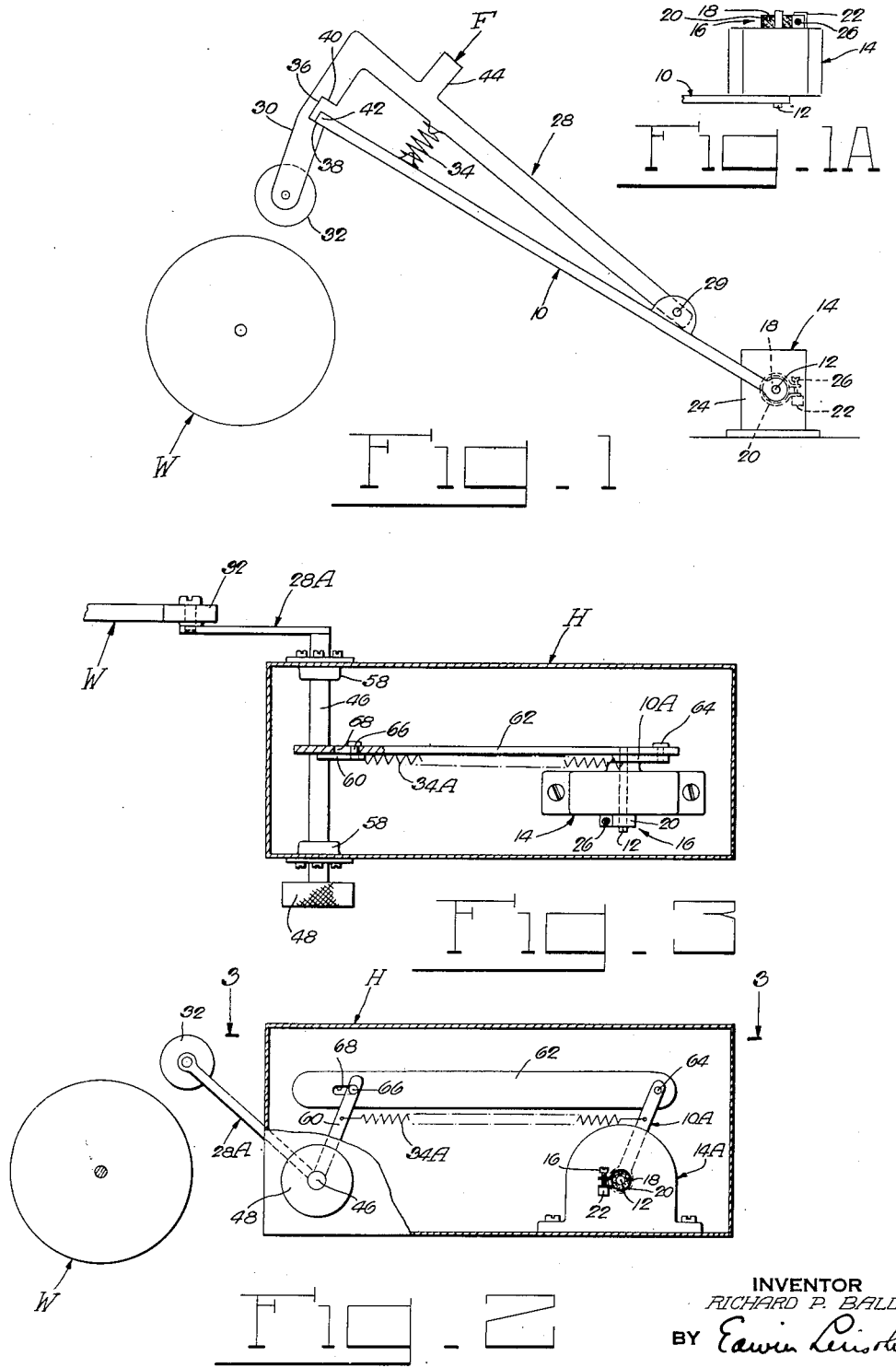
INVENTOR
RICHARD P. BALLOU
BY Edwin Leristen
ATTORNEY Patented Jan. 1, 1952

2,580,717

UNITED STATES PATENT OFFICE 2,580,717

MECHANICAL MEASURING DEVICE

Richard P. Ballou, Hartford, Conn., assignor to Federal Electric Products Company, Newark, N. J., a corporation Application January 15, 1948, Serial No. 2,490

10 Claims. (Cl. 201—48)

This invention relates to measuring devices and more particularly, but without limitation, to devices for indicating the diameter of a wheel or roll or for performing an operation dependent upon the diameter of a wheel or roll.

While useful for other purposes, the invention is intended primarily for use in conjunction with electric control means for operating an abrasive wheel at a constant peripheral speed for which purpose it is necessary to vary the rotary speed of the wheel to compensate for the decrease in the diameter of the wheel due to wear. On the other hand the invention may be applied, for example, to wheels of increasing diameter, for example in conjunction with paper take-up reels or rolls whereby to vary the rotary speed of the "wheel" to compensate for the increase in the diameter thereof as more and more paper or other material is wound on the wheel or roll.

The primary purpose of the present invention is to provide a device which obviates the necessity for continuous contact of the measuring device with the wheel and more specifically to provide a device which is operable pursuant to only momentary contact of the device with the wheel and which, moreover, when retracted from contact does not disturb or change the position of the part or parts to which the latter were moved, in the immediately preceding operation of the device.

The invention as well as the above and other objects, features and advantages thereof will be fully understood from the following description considered in connection with the accompanying illustrative drawings:

In the drawings:

Fig. 1 is a side view of a device embodying the present invention, showing the latter in juxtaposition to a wheel;

Fig. 1A is a top plan view of part of the device shown in Fig. 1;

Fig. 2 is a side view of a device embodying the present invention, showing another form thereof, the housing for parts of the device being shown partly in section;

Fig. 3 is a sectional view on the line 3—3 of Fig. 2.

Referring now to the drawings in detail and first to the more elementary form of the invention shown in Fig. 1, the device comprises an arm 10 which is fixed to the shaft 12 of means indicated more or less diagrammatically at 14. The means 14 may be a rheostat or potentiometer or part of any other adjustable means operable to control the speed of rotation of an electric motor (not shown) for driving the shaft of the wheel W, or said means 14 may be an indicator of any suitable type whereby to indicate the angular movements of arm 10 and, with suitable calibration of the scale of the indicator, to indicate the diameter of the wheel. Although arm 10 is movable when sufficient force is applied thereto, said arm remains stationary unless a predetermined force is applied thereto. For thus holding the arm stationary and yet permitting movement thereof in response to a predetermined force which is applied thereto, the normal friction of the shaft 12 and of the other elements of means 14 is ordinarily sufficient. However for the purpose of illustration, there is shown a friction device 16 which opposes, but does not prevent, turning of shaft 12, it being understood that said friction device may be dispensed with when the inherent static friction of the movable parts of means 14 is sufficient, and it being further understood that any other suitable friction device may be provided in lieu of that shown in case a device is necessary for providing friction in addition to the inherent friction of the means 14. The friction device 16 may comprise, as here shown, a stationary friction member 18 or liner formed of leather or any other suitable material, which engages a part of the shaft 12 therearound and which is held stationary by the adjustable clamping collar 20 fixed to a lug 22 carried by the casing 24 of the means 14. A screw 26 is provided for adjusting the pressure of friction liner 18 on shaft 12 and thereby adjusting the static friction of said device.

An element 28 which as here shown is in the form of an arm, is pivotally mounted on arm 10 by pivot pin 29 or in any other suitable way whereby said element is movable toward and away from the wheel W. For convenience in reference arm 28 may be designated as the contact member of the device. The contact member 28 includes a part 30 which carries a roller 32 for anti-friction contact with the periphery of wheel W, when member 28 is moved from its retracted position, shown in Fig. 1, to its projected or wheel-contacting position. A compression spring 34 normally holds member 28 in its retracted position, and in this connection it will be understood that said spring 34 is strong enough to hold member 28 against pivotal movement with respect to arm 10 but is weak in relation to the static friction of means 14 and is therefore incapable of moving arm 10, regardless of the extent to which said spring may be compressed within the range of compression which can occur in the operation of the device.

A lost-motion connection is provided between arms 10 and 28, so that arm 28 must be moved a definite distance from its retracted position toward wheel W before additional movement of said arm in the same direction is effective to move arm 10 in that direction to a measurement-indicating position. As here shown said lost-motion connection includes a groove 36 provided in part 30 of arm 28, the opposite ends of said groove being defined by the confronting shoulders 38 and 40 between which the free end 42 of arm 10 is positioned. When a force F is applied to arm 10, for example to the projection 44 thereof, for moving said arm toward wheel W, spring 34 is compressed without moving arm 10 until shoulder 40 engages the end 42 of arm 10, whereupon continued movement of arm 28 in the same direction positively moves arm 10 toward wheel W until roller 32 engages the periphery of said wheel. As soon as roller 32 is brought into contact with wheel W the force F is removed from arm 28, and spring 34 thereupon immediately moves and retracts roller 32 from the wheel to the extent allowed by the length of groove 36, that is, until shoulder 38 engages end 42 of arm 10. It will be understood that the return movement of contact member 28 to its retracted position takes place without movement of arm 10 from its measurement-indicating position, since spring 34, even when compressed to the full extent allowed by the length of groove 36, does not have sufficient force to move arm 10 in either direction against the static friction of means 14. It will be understood that the force F which is applied to arm 28 may be applied manually or in any other suitable way, for example by an electromagnet.

Referring now to the presently preferred form of the invention illustrated in Figs. 2 and 3, it will be noted that the contact member 28A which corresponds to the contact member 28 of the device shown in Fig. 1 is fixed to a rotary shaft 46 mounted in a housing H, said member 28A being disposed externally of said housing and shaft 46 being rotatable by a knob 48 which is disposed externally of said housing. Housing H is completely closed to protect the various parts of the device which are enclosed therein, and as herein shown glands 58 are provided to seal the housing at the parts thereof through which shaft 46 projects. The arm 10A corresponds to the arm 10 and is connected to the shaft 12 of the means 14A, which corresponds to the means 14. A friction device for means 14A is indicated at 16 and it is shown of the same construction as the friction device of Fig. 1. An arm 60 is fixed to shaft 46 and is connected to arm 10A by a link 62. A tension spring 34A is connected at its opposite ends to arms 10A and 60, respectively, and corresponds to the spring 34 of Fig. 1. Arm 10A is pivotally connected to link 62 in any suitable way as by a pivot pin 64, while arm 60 is connected to said link 62 by a pin 66 which engages link 62 in a slot 68, thus providing a lost-motion connection between arm 60 and arm 10A and indirectly, through shaft 46, between contact member 28A and arm 10A. It will be understood that spring 34A is insufficient to overcome the static friction of arm 10A but is sufficiently strong to retract contact member 28A from wheel W.

It is considered that the operation of the device shown in Figs. 2 and 3 is obvious from the above description, however it may be noted that when it is desired to operate the contact device knob 48 is turned in a counterclockwise direction until roller 32 contacts the periphery of wheel W and is thereupon immediately released with the result that spring 34A acting upon contact member 28A through arm 60 and shaft 46, immediately moves contact member 28A to its retracted position without however moving arm 10A. It will be noted that when knob 48 is turned in a counterclockwise direction for moving contact member 28A toward wheel W, arm 10A is not moved until pin 66 engages the left hand end of the slot 68 and that continued movement of knob 48 in the same direction until roller 32 engages the periphery of wheel W results in a corresponding movement of arm 10A for adjusting the means 14A. When knob 48 is released spring 34A acting on arm 60 moves the latter in a clockwise direction until pin 66 engages the right hand end of slot 68. It will be understood that link 62 may be of a suitable length for connection to a plurality of means 14A by a corresponding plurality of companion arms 10A.

As indicated above, the devices embodying the present invention may be used in conjunction with rolls or "wheels" of increasing diameter, for example with a take-up reel on which paper or other material is wound. In such application or use of the device, the lost motion between arms 10 and 28 (Fig. 1) provided by groove 36 or between arms 10A and 28A (Figs. 3 and 4) must be sufficient to permit roller 32 to be retracted or moved away from the "wheel" to a position at a greater distance than the increase in the diameter of the "wheel" between successive operations of the device, i. e., between successive movements of arm 10 or 10A toward the wheel. Further it will be understood that the rheostat or other means 14 or 14A will be of such design or so arranged as to cut in or cut out resistance as may be required for the desired control of the speed of the motor which drives the "wheel," or or so that the same device may be used in conjunction with wheels which either decrease or increase in diameter.

The invention may be embodied in various ways other than those hereinbefore specifically described and in the forms of the invention herein shown or described various changes in the details of construction and in the arrangement of parts may be made without departing from the underlying idea or principles of the invention within the scope of the appended claims.

Having thus described my invention, what I claim and desire to secure by Letters Patent is:

1. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, resilient means acting on said first member for moving the latter in the direction away from said object and relatively to said second member, and means operative upon said second member for retaining said second member in said measurement-indicating position against the force of said resilient means whereby said second member remains stationary in the latter position thereof during the relative movement of said two members.

2. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, resilient means acting on both of said members for moving said first member in the direction away from said object and relatively to said second member, and means operative upon said second member or retaining said second member in said measurement-indicating position against the force of said resilient means whereby said second member remains stationary in the latter position thereof during the relative movement of said two members.

3. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, resilient means acting on said first member for moving the latter in the direction away from said object and relatively to said second member, and means operative upon said second member for retaining said second member in said measurement-indicating position against the force of said resilient means whereby said second member remains stationary in the latter position thereof during the relative movement of said two members, and movable means operable by said second member in accordance with the extent of movement of said first member in the direction toward said object.

4. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, resilient means acting on said first member for moving the latter in the direction away from said object and relatively to said second member, and means operative upon said second member for retaining said second member in said measurement-indicating position against the force of said resilient means whereby said second member remains stationary in the latter position thereof during the relative movement of said two members, and a rheostat operable by said second member in accordance with the extent of movement of said first member in the direction toward said object.

5. A measuring device for use with means for controlling the speed of an electric motor which drives a wheel, said device comprising a first member mounted for movement in directions toward and away from the wheel periphery, a second member to which said first member is operatively connected, a lost-motion mechanism in said connection so constructed and arranged that said second member is movable from a predetermined position thereof to a measurement-indicating position by said first member after a predetermined movement of the latter in the direction toward said wheel to effect the measurement, resilient means acting on said first member for moving the latter in the direction away from the wheel periphery and relatively to said second member, and means operative upon said second member for retaining said second member in said measurement-indicating position against the force of said resilient means whereby said second member remains stationary during the relative movement of said two members, and movable means forming a part of said speed controlling means operable by said second member in accordance with the extent of movement of said first member in the direction toward said wheel periphery.

6. A measuring device comprising a first member mounted for movement in directions toward and away from an object, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, friction-producing means operative upon said second member for retaining said second member in said measurement-indicating position except when sufficient force is exerted thereon to overcome the friction of said means, and means acting on both of said members with sufficient force to move only said first member in the direction away from said object and relatively to said second member upon release of said first member following its movement in the direction toward said object.

7. A measuring device for use with means for controlling the speed of an electric motor which drives a wheel, said device comprising a first member mounted for movement in directions toward and away from the wheel periphery, a second member to which said first member is operatively connected, a lost-motion mechanism in said connection so constructed and arranged that said second member is movable from a predetermined position thereof to a measurement-indicating position by said first member after a predetermined movement of the latter in the direction toward said wheel to effect the measurement, resilient means acting on said first member for moving the latter in the direction away from the periphery of the wheel and relatively to said second member, and means operative upon said second member for retaining said second member in said measurement-indicating position against the force of said resilient means whereby said second member remains stationary in the latter position thereof during the relative movement of said two members, and movable means operable by said second member in accordance with the extent of movement of said first member in the direction toward said wheel periphery, said first member being provided with a roller constructed and arranged for anti-friction contact with the wheel periphery while said wheel is rotating.

8. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, and resilient means acting on said first member for moving the latter in the direction away from said object and relatively to said second member, and means operative upon said second member for retaining said second member in said measurement-indicating position against the force of said resilient means whereby said second member remains stationary in the latter position thereof during the relative movement of said two members, said first member being pivotally mounted on said second member for said movement of the first member in the direction toward and away from the object and having an object-contacting part projecting beyond said second member in the direction of movement of said first member toward the object.

9. A measuring device comprising a first member mounted for movement in directions toward and away from the object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction toward said object to effect the measurement, said second member being held stationary in said measurement-indicating position by friction except when sufficient force is exerted thereon to overcome said friction, and means acting on both of said members with sufficient force to move only said first member in the direction away from said object and relatively to said second member upon release of said first member following its movement in the direction toward said object, and rotatable means operatively connected to said first-mentioned member for moving the latter in the direction toward the object, said lost-motion mechanism including a link pivotally connected to said second member and provided with a slot and including a part of said rotatable means connected to said link for movement in said slot.

10. A measuring device comprising a first member mounted for movement in directions toward and away from an object to be measured, a second member to which said first member is operatively connected, a lost-motion mechanism in said connection so constructed and arranged that said second member is movable from a predetermined position thereof to a measurement-indicating position by said first member after a predetermined movement of the latter in the direction to effect the measurement toward said object, said second member being held stationary in said measurement-indicating position by friction except when sufficient force is exerted thereon to overcome said friction, and means acting on both of said members with sufficient force to move only said first member in the direction away from said object and relatively to said second member upon release of said first member following its movement in the direction toward said object, and rotatable means operatively connected to said first-mentioned member for moving the latter in the direction toward the object, said lost-motion mechanism including a link pivotally connected to said second member and provided with a slot and including a part of said rotatable means connected to said link for movement in said slot, said means for moving said first member in the direction away from the object comprising a spring connected between said second member and said part of the rotatable means.

RICHARD P. BALLOU.

REFERENCES CITED

The following references are of record in the file of this patent:

UNITED STATES PATENTS

| Number | Name | Date |
|---|---|---|
| 843,276 | Irish | Feb. 5, 1907 |
| 1,153,142 | Thompson | Sept. 7, 1915 |
| 1,362,709 | Lee | Dec. 2, 1920 |
| 1,569,672 | Peabody et al. | Jan. 12, 1926 |
| 1,893,217 | Bobitch | Jan. 3, 1933 |
| 2,389,436 | Kearney | Nov. 20, 1945 |
| 2,442,630 | Wickesser | June 1, 1948 |